US010282380B2

(12) United States Patent
Matsuya et al.

(10) Patent No.: US 10,282,380 B2
(45) Date of Patent: May 7, 2019

(54) DATA RETRIEVAL/DISTRIBUTION METHOD AND APPARATUS, AND STORAGE MEDIUM

(71) Applicant: Hitachi, Ltd., Tokyo (JP)

(72) Inventors: Kazuhiro Matsuya, Tokyo (JP); Naoki Ikawa, Tokyo (JP); Atsushi Hirata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 15/126,667

(22) PCT Filed: Jul. 16, 2014

(86) PCT No.: PCT/JP2014/068960
§ 371 (c)(1),
(2) Date: Sep. 16, 2016

(87) PCT Pub. No.: WO2016/009517
PCT Pub. Date: Jan. 21, 2016

(65) Prior Publication Data
US 2017/0091328 A1    Mar. 30, 2017

(51) Int. Cl.
*G06F 16/951* (2019.01)
*G06F 16/957* (2019.01)
*G06F 16/11* (2019.01)

(52) U.S. Cl.
CPC .......... *G06F 16/951* (2019.01); *G06F 16/116* (2019.01); *G06F 16/9577* (2019.01)

(58) Field of Classification Search
None
See application file for complete search history.

(56) References Cited

U.S. PATENT DOCUMENTS 7,130,844 B2 * 10/2006 Elder ................. G06F 17/30651
10,019,679 B2 * 7/2018 Ogata .................. G06Q 10/063
(Continued)

FOREIGN PATENT DOCUMENTS

JP    2003-067329 A    3/2003
JP    2012-164369 A    8/2012

OTHER PUBLICATIONS

Shuji Fujiwara et al., "A Unified Query Processing Technique with Metadata in Sensor Network", Network Security, Mar. 10, 2009, p. 3-83 to 3-84.

(Continued)

*Primary Examiner* — Wilson Lee
(74) *Attorney, Agent, or Firm* — Mattingly & Malur, PC

(57) ABSTRACT

In a data retrieval/distribution apparatus which retrieves designated information from the collected data in accordance with a retrieval/distribution request sent from a data retrieval/distribution client, and sends a retrieval result to the data retrieval/distribution client, the data retrieval/distribution client sends, to the data retrieval/distribution server, the retrieval/distribution request including a first retrieval condition using a virtual data conversion definition, which is a virtualization of data conversion definitions as a definition for converting the collected data into a distribution format, a processing unit of the data retrieval/distribution apparatus generates a second retrieval condition using each of the data conversion definitions from the first retrieval condition, executes retrieval processing according to the generated second retrieval condition, and sends a retrieval result of the retrieval processing to the data retrieval/distribution client as a retrieval result according to the first retrieval condition.

12 Claims, 19 Drawing Sheets

(56) References Cited

U.S. PATENT DOCUMENTS

| | | | | |
|---|---|---|---|---|
| 2006/0206889 A1* | 9/2006 | Ganesan | ............ | H04N 7/17318 |
| | | | | 717/169 |
| 2007/0011147 A1* | 1/2007 | Falkenberg | ....... | G06F 17/30634 |
| 2010/0049821 A1* | 2/2010 | Oved | ...................... | G06F 9/542 |
| | | | | 709/212 |
| 2010/0223467 A1* | 9/2010 | Dismore | ........... | G06F 17/30893 |
| | | | | 713/168 |
| 2013/0031555 A1* | 1/2013 | Tobin | ................ | G06F 17/30545 |
| | | | | 718/102 |
| 2014/0358411 A1* | 12/2014 | Khoe | ....................... | G08G 1/13 |
| | | | | 701/117 |
| 2014/0359565 A1* | 12/2014 | Frankel | .................. | G08C 17/02 |
| | | | | 717/106 |
| 2015/0169602 A1* | 6/2015 | Shankar | ............ | G06F 17/30091 |
| | | | | 707/825 |

OTHER PUBLICATIONS

Yuto Hamaguchi et al., "A Design and Implementation of Description Method for Data Aggregation on Integrated Sensor Networks", IPSJ SIG Technical Report, Dec. 15, 2011, p. 1-8.
International Search Report of PCT/JP2014/068960 dated Aug. 12, 2014.

* cited by examiner

| BODY MODEL NAME | BODY IDENTIFIER | OPERATING HOURS | ... |
|---|---|---|---|
| 0 | 4 | 9 | 15 |

OFFSET VALUE (UNIT: BYTE)

(B)

| BODY MODEL NAME | BODY IDENTIFIER | OPERATING START TIME | OPERATING END TIME | ... |
|---|---|---|---|---|
| 0 | 4 | 9 | 15 | 21 |

OFFSET VALUE (UNIT: BYTE)

FIG.3

| DATA CONVERSION DEFINITION IDENTIFIER | CONVERSION ITEM NAME | CONVERSION METHOD |
|---|---|---|
| D_DUMP_A_X | BODY MODEL NAME | EXTRACT FROM 0TH BYTE TO 3RD BYTE |
| | BODY IDENTIFIER | EXTRACT FROM 4TH BYTE TO 8TH BYTE |
| | OPERATING HOURS | EXTRACT FROM 9TH BYTE TO 14TH BYTE |
| | ... | ... |
| D_DUMP_B_Y | BODY MODEL NAME | EXTRACT FROM 0TH BYTE TO 3RD BYTE |
| | BODY IDENTIFIER | EXTRACT FROM 4TH BYTE TO 8TH BYTE |
| | OPERATING START TIME | EXTRACT FROM 9TH BYTE TO 14TH BYTE |
| | OPERATING END TIME | EXTRACT FROM 15TH BYTE TO 20TH BYTE |
| | ... | ... |
| ... | ... | ... |

| VIRTUAL DATA CONVERSION DEFINITION IDENTIFIER | VIRTUAL CONVERSION ITEM NAME | DATA CONVERSION DEFINITION IDENTIFIER | ASSOCIATING METHOD |
|---|---|---|---|
| DUMP | BODY MODEL NAME | DUMP_A_X | BODY MODEL NAME |
| | | DUMP_B_Y | BODY MODEL NAME |
| | | ... | ... |
| | BODY IDENTIFIER | DUMP_A_X | BODY IDENTIFIER |
| | | DUMP_B_Y | BODY IDENTIFIER |
| | | ... | ... |
| | OPERATING HOURS | DUMP_A_X | OPERATING HOURS |
| | | DUMP_B_Y | (OPERATING END TIME) − (OPERATING START TIME) |
| | | ... | ... |
| | ... | ... | ... |
| ... | ... | ... | ... |
| 37A | 37B | 37C | 37D |

FIRST RETRIEVAL CONDITION

```
SELECT BODY MODEL NAME, BODY IDENTIFIER, OPERATING HOURS FROM COLLECTED DATA
WHERE: VIRTUAL DATA CONVERSION DEFINITION IDENTIFIER = 'DUMP';
```

(B-1)

SECOND RETRIEVAL CONDITION (1)

```
SELECT BODY MODEL NAME, BODY IDENTIFIER, OPERATING HOURS FROM COLLECTED DATA
WHERE: DATA CONVERSION DEFINITION IDENTIFIER = 'DUMP_A_X';
```

(B-2)

SECOND RETRIEVAL CONDITION (2)

```
SELECT BODY MODEL NAME, BODY IDENTIFIER, OPERATING END TIME—
 OPERATING START TIME FROM COLLECTED DATA
WHERE: DATA CONVERSION DEFINITION IDENTIFIER = 'DUMP_B_Y';
```

(C)

RETRIEVAL RESULT FILE ⟋FL

```
BODY MODEL NAME, BODY IDENTIFIER, OPERATING HOURS
AX01,      10000,     10:00:00
AX01,      10001,     11:00:00
BY01,      20000,     12:00:00
  ...
```

FIG.6

| DATA CONVERSION DEFINITION IDENTIFIER | COLLECTED DATA |
|---|---|
| DUMP_A_X | 0x01 0x00 0x00 0x00 0x00 0x01 ··· |
| | 0x01 0x00 0x00 0x00 0x00 0x02 ··· |
| | ··· |
| DUMP_B_Y | 0x02 0x00 0x00 0x00 0x00 0x01 ··· |
| | 0x02 0x00 0x00 0x00 0x00 0x02 ··· |
| | ··· |
| ··· | ··· |

| VIRTUAL DATA CONVERSION DEFINITION IDENTIFIER | DATA CONVERSION DEFINITION IDENTIFIER | GENERATION METHOD OF SECOND RETRIEVAL CONDITION |
|---|---|---|
| DUMP | DUMP_A_X | SUBSTITUTE VIRTUAL CONVERSION ITEM NAME OF FIRST RETRIEVAL CONDITION WITH CONVERSION ITEM IN EACH DATA CONVERSION DEFINITION ACCORDING TO ASSOCIATING METHOD. CONVERT VIRTUAL DATA CONVERSION DEFINITION IDENTIFIER INTO EACH DATA CONVERSION DEFINITION IDENTIFIER |
| | DUMP_B_Y | |
| | ··· | |
| ··· | ··· | ··· |

| VIRTUAL DATA CONVERSION DEFINITION IDENTIFIER | VIRTUAL CONVERSION ITEM NAME | DATA CONVERSION DEFINITION IDENTIFIER | ASSOCIATING METHOD | VIRTUAL APPLICABILITY |
|---|---|---|---|---|
| CONSTRUCTION_MACHINE | BODY MODEL NAME | DUMP | BODY MODEL NAME | APPLICABLE |
| | BODY MODEL NAME | SHOVEL | BODY MODEL NAME | APPLICABLE |
| | ... | ... | ... | ... |
| DUMP | BODY MODEL NAME | DUMP_A_X | BODY MODEL NAME | NOT APPLICABLE |
| | | DUMP_B_Y | BODY MODEL NAME | NOT APPLICABLE |
| | ... | ... | ... | ... |
| SHOVEL | BODY MODEL NAME | SHOVEL_C_Z | BODY MODEL NAME | NOT APPLICABLE |
| | | SHOVEL_D_W | BODY MODEL NAME | NOT APPLICABLE |
| | ... | ... | ... | ... |
| ... | ... | ... | ... | ... |

| DATA CONVERSION DEFINITION IDENTIFIER | CONVERSION TIMING |
|---|---|
| DUMP_A_X | UPON COLLECTION |
| DUMP_B_Y | UPON COLLECTION |
| DUMP | UPON DISTRIBUTION |
| ... | ... |

| CONVERSION DEFINITION IDENTIFIER | BODY MODEL NAME | BODY IDENTIFIER | OPERATING HOURS | ... |
|---|---|---|---|---|
| DUMP_A_X | AX01 | 10000 | 10:00:00 | ... |
| | AX01 | 10001 | 11:00:00 | ... |
| | ... | ... | ... | ... |
| DUMP_B_Y | BY01 | 20000 | 12:00:00 | ... |
| | BY01 | 20001 | 13:00:00 | ... |
| | ... | ... | ... | ... |
| ... | ... | ... | ... | ... |

63A | 63B | 63B | 63B | 63B

63

DATA RETRIEVAL/DISTRIBUTION METHOD AND APPARATUS, AND STORAGE MEDIUM

TECHNICAL FIELD

The present invention relates to a data retrieval/distribution technology.

BACKGROUND ART

In recent years, as a model for utilizing and applying big data, a model which accumulates vast amounts of data collected from a data source such as a sensor device, and extracting and providing information with new value from the accumulated data is becoming the trend. A system which flexibly collects a wide variety of data and distributes the collected data according to the usage is the foundation for supporting the creation of valuable information by analyzing the retrieval results while changing the perspective of data retrieval.

In realizing this kind of system (this system is hereinafter referred to as the "data retrieval/distribution system"), in order to absorb the difference between the data format collected from the data source and the data format used by the data user, PTL 1 discloses a scheme related to an apparatus which analyzes the collected data, and converts the collected data into a distribution format in accordance with a predetermined conversion definition based on the analytical result.

CITATION LIST

Patent Literature

PTL 1: Japanese Laid-Open Patent Application Publication No. 2003-67329

SUMMARY OF THE INVENTION

Problems to be Solved by the Invention

However, when performing data retrieval/distribution based on the foregoing scheme, the following problems arise when the data user acquires one's intended data by changing the perspective of data retrieval.

First, there is no flexibility of being able to add a data format to be collected from a new data source as the target of data retrieval without having to modify the application.

For example, considered is a case of acquiring the operating hours of "dump trucks" such as a Company A-manufactured dump truck model X, a Company B-manufactured dump truck model Y, . . . . Here, let it be assumed that, in the collected data from the existing Company A-manufactured dump truck model X, Company B-manufactured dump truck model Y, . . . , the operating hours are included as "operating hours", but in the collected data from a Company C-manufactured dump truck model Z to be newly added, "operating hours" are not directly included, and only "operating start time" and "operating end time" are included. In the foregoing case, in order to enable data retrieval from the perspective of "dump trucks", with regard to the collected data from the Company C-manufactured dump truck model Z, the application needs to be modified so that the "operating hours" can be calculated based on "operating end time–operating start time".

Second, there is no flexibility of being able to create an application capable of performing a batch retrieval from an abstract perspective or changing the perspective of data retrieval in an ad hoc manner.

For example, in the case of acquiring the operating hours of "dump trucks" such as a Company A-manufactured dump truck model X, a Company B-manufactured dump truck model Y, . . . , the data user needs to request the retrieval of operating hours for each individual target (Company A-manufactured dump truck model X, Company B-manufactured dump truck model Y, . . . ) from which the operating hours are to be acquired. Thus, the data user is unable to perform a batch data retrieval from an abstract perspective such as "dump trucks" or "construction machinery", nor can the data user change the perspective of data retrieval including such abstract perspective in an ad hoc manner.

The present invention was devised in view of the foregoing points, and an object of this invention is to resolve the two problems described above and remarkably improve the user-friendliness of a data retrieval/distribution system.

Means to Solve the Problems

In order to achieve the foregoing object, the present invention provides a data retrieval/distribution method to be executed in a data retrieval/distribution apparatus which collects data from a data source, accumulates the collected data, retrieves from the collected data, in accordance with a retrieval/distribution request sent from a data retrieval/distribution client, information designated in the retrieval/distribution request, and sends a retrieval result to the data retrieval/distribution client, wherein the data retrieval/distribution apparatus comprises a storage device which stores various programs and various types of information, and a processing unit which executes the various types of processing based on the programs and the information stored in the storage device, wherein the data retrieval/distribution method comprises a first step of the data retrieval/distribution client sending, to the data retrieval/distribution server, the retrieval/distribution request including a first retrieval condition using a virtual data conversion definition, which is a virtualization of data conversion definitions as a definition for converting the collected data into a distribution format, a second step of the processing unit generating a second retrieval condition using each of the data conversion definitions from the first retrieval condition, a third step of the processing unit executing retrieval processing according to the generated second retrieval condition, and a fourth step of the processing unit sending a retrieval result of the retrieval processing to the data retrieval/distribution client as a retrieval result according to the first retrieval condition.

Moreover, the present invention additionally provides a data retrieval/distribution apparatus which collects data from a data source, accumulates the collected data, retrieves from the collected data, in accordance with a retrieval/distribution request sent from a data retrieval/distribution client, information designated in the retrieval/distribution request, and sends a retrieval result to the data retrieval/distribution client, wherein the data retrieval/distribution client sends, to the data retrieval/distribution server, the retrieval/distribution request including a first retrieval condition using a virtual data conversion definition, which is a virtualization of data conversion definitions as a definition for converting the collected data into a distribution format, and wherein the data retrieval/distribution client comprises a retrieval condition generation unit which generates a second retrieval condition using each of the data conversion definitions from the first retrieval condition, a retrieval execution unit which executes retrieval processing according to the generated second retrieval condition, and a retrieval result sending unit which sends a retrieval result of the retrieval processing to the data retrieval/distribution client as a retrieval result according to the first retrieval condition.

Furthermore, the present invention additionally provides a storage medium storing a program to be executed in a data retrieval/distribution apparatus which collects data from a data source, accumulates the collected data, retrieves from the collected data, in accordance with a retrieval/distribution request sent from a data retrieval/distribution client, information designated in the retrieval/distribution request, and sends a retrieval result to the data retrieval/distribution client, wherein the data retrieval/distribution client sends, to the data retrieval/distribution server, the retrieval/distribution request including a first retrieval condition using a virtual data conversion definition, which is a virtualization of data conversion definitions as a definition for converting the collected data into a distribution format, and wherein the program causes the data retrieval/distribution apparatus to execute processing comprising a first step of generating a second retrieval condition using each of the data conversion definitions from the first retrieval condition, a second step of executing retrieval processing according to the generated second retrieval condition, and a third step of sending a retrieval result of the retrieval processing to the data retrieval/distribution client as a retrieval result according to the first retrieval condition.

According to the data retrieval/distribution method and apparatus and the program stored in the storage medium of the present invention, even in cases of adding, as a retrieval target, collected data of a new data format that differs from the data format of existing collected data, there is no need to modify the application loaded in the data retrieval/distribution apparatus, and the situation can be dealt with merely by defining the correspondence relation of the respective items of the virtual data conversion definitions and the items of the individual data conversion definitions.

Moreover, according to the data retrieval/distribution method and apparatus and the program stored in the storage medium of the present invention, merely by setting a virtual data conversion definition from the intended perspective, it is possible to perform a batch retrieval from an abstract perspective or change the perspective of data retrieval in an ad hoc manner.

Advantageous Effects of the Invention

According to the present invention, it is possible to realize a data retrieval/distribution method and apparatus and a storage medium capable of remarkably improving the user-friendliness of a data retrieval/distribution system.

BRIEF DESCRIPTION OF DRAWINGS

FIG. 2A and FIG. 2B are conceptual diagrams showing a configuration example of the collected data.

FIG. 3 is a chart showing a configuration example of the data conversion definition table.

FIG. 4 is a chart showing a configuration example of the virtual data conversion definition table according to the first embodiment.

FIG. 5A shows a configuration example of the first retrieval condition, FIG. 5B-1 and FIG. 5B-2 show a configuration example of the second retrieval condition, and FIG. 5C is a conceptual diagram showing a configuration example of the retrieval result file.

FIG. 6 is a chart showing a storage example of the collected data in the collected data storage area.

FIG. 7 is a conceptual diagram showing a configuration example of the retrieval condition generation definition table.

FIG. 13 is a chart showing a configuration example of the virtual data conversion definition table according to the second embodiment.

FIG. 17 is a conceptual diagram showing a configuration example of the conversion timing definition table.

FIG. 18 is a conceptual diagram showing a configuration example of the converted data table.

DESCRIPTION OF EMBODIMENTS

Figure 1:
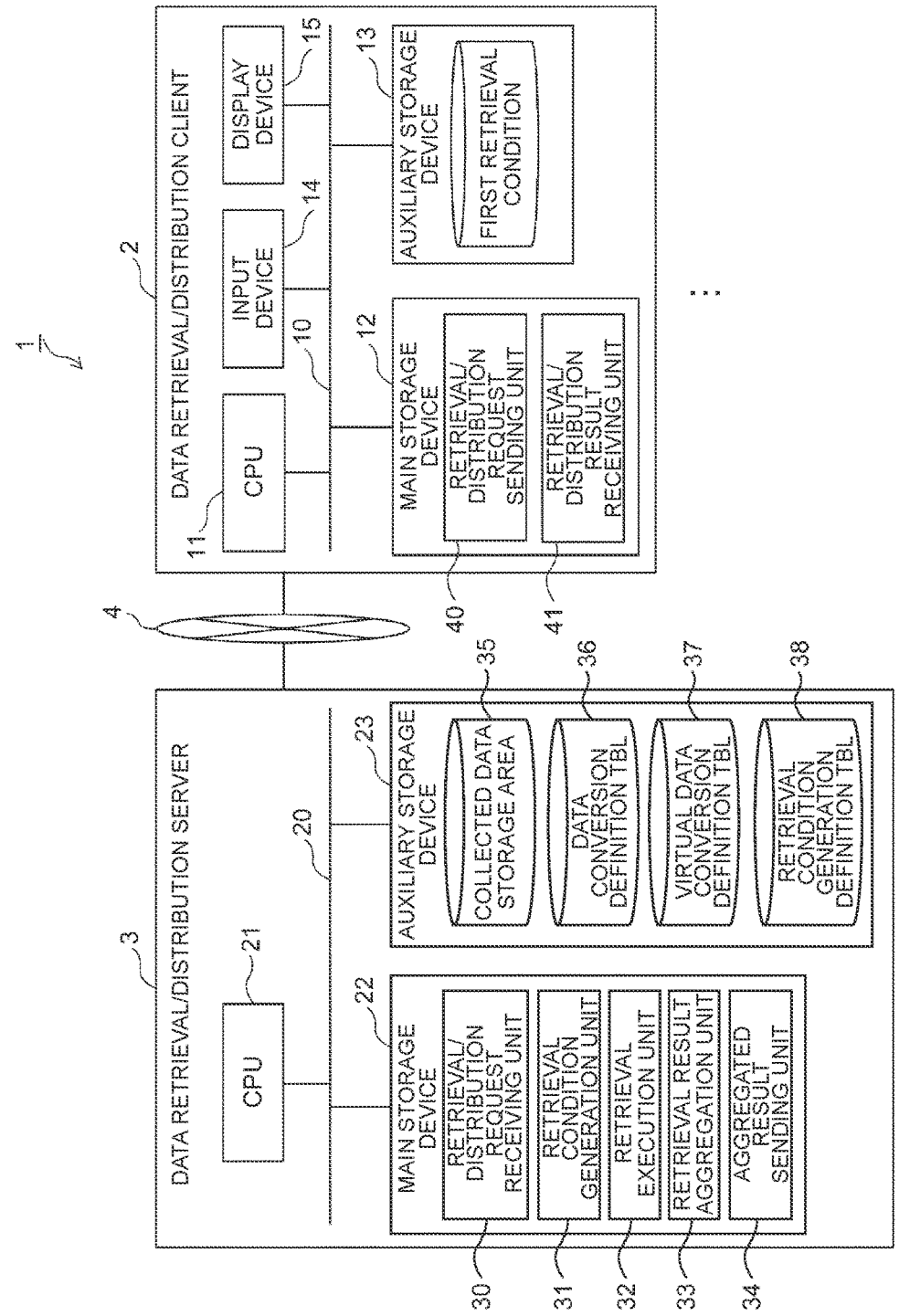
FIG. 1 is a block diagram showing a schematic configuration of the data retrieval/distribution system according to the first embodiment.

An embodiment of the present invention is now explained in detail with reference to the appended drawings.
(1) First Embodiment
(1-1) Configuration of Data Retrieval/Distribution System of this Embodiment In FIG. 1, reference numeral 1 indicates the overall data retrieval/distribution system according to this embodiment. The data retrieval/distribution system 1 is configured by comprising one or more data retrieval/distribution clients 2 and a data retrieval/distribution server 3 connected via a network 4.

The data retrieval/distribution client 2 is a communication terminal device with a function of retrieving information designated by a user according to that user's operation, and sending a request to the data retrieval/distribution server 3 to the effect of distributing the retrieval result (this request is hereinafter referred to as the "retrieval/distribution request"). The data retrieval/distribution client 2 is configured by comprising a CPU (Central Processing Unit) 11, a main storage device 12, an auxiliary storage device 13, an input device 14 and a display device 15 which are connected via an internal bus 10.

The CPU 11 is a processor that governs the operational control of the overall data retrieval/distribution client 2.

Moreover, the main storage device 12 is configured, for example, from a volatile semiconductor memory, and is used for temporarily storing various programs and data. The auxiliary storage device 13 is configured, for example, from a large capacity nonvolatile storage device such as a hard disk device or an SSD (Solid State Drive), and is used for retaining programs and various types of data for a long period of time.

The input device 14 is configured, for example, from a keyboard or a mouse, and is used upon inputting various commands and information of the first retrieval condition described later. Moreover, the display device 15 is configured, for example, from a liquid crystal panel, and is used for displaying necessary screens and information as needed.

The data retrieval/distribution server 3 is a server device with a function of collecting data from a data source and accumulating the data that was collected (this data is hereinafter referred to as the "collected data"), as well as retrieving corresponding information from the collected data according to the foregoing retrieval/distribution request sent from the data retrieval/distribution client 2, and sending the retrieval result to the data retrieval/distribution client 2. The data retrieval/distribution server 3 is configured by comprising a CPU 21, a main storage device 22 and an auxiliary storage device 23 which are connected via an internal bus 20.

The CPU 21 is a processor that governs the operational control of the overall data retrieval/distribution server 3. Moreover, the main storage device 22 is configured, for example, from a volatile semiconductor memory, and is used for temporarily storing various programs and data. The auxiliary storage device 23 is configured, for example, from a large capacity nonvolatile storage device such as a hard disk device or an SSD (Solid State Drive), and is used for retaining programs and various types of data for a long period of time.

The various programs stored in the auxiliary storage device 23 are read into the main storage device 22 when the data retrieval/distribution server 3 is activated or as needed, and the various types of processing described later are performed as a result of the programs read into the main storage device 22 being executed by the CPU 21.

(1-2) Data Retrieval/Distribution Function According to this Embodiment

The data retrieval/distribution function equipped in the data retrieval/distribution server 3 is now explained. In the data retrieval/distribution server 3, while a plurality of related data conversion definitions are respectively managed as individual data conversion definitions on the one hand, they are also virtualized and managed as one virtual data conversion definition (this is hereinafter referred to as the "virtual data conversion definition"). Moreover, the data retrieval/distribution server 3 is equipped with a data retrieval/distribution function of generating, when a retrieval/distribution request including a first retrieval condition using the virtual data conversion definition is provided by the data retrieval/distribution client, a second retrieval condition according to the respective data conversion definitions from the first retrieval condition, and performing retrieval processing by using the generated second retrieval condition.

Here, the term "data conversion definition" refers to the definition relating to the method of converting the collected data, which was collected by the data retrieval/distribution server 3 from the data source, into a format for distributing the collected data to the data retrieval/distribution client 2. The data conversion definition is pre-set by the user.

For example, in a case where the collected data to be collected from the Company A-manufactured dump truck model X is of the format illustrated in FIG. 2A, in the collected data, the "body model name" can be defined as being an extraction from the 0th byte to the third 3 byte, the "body identifier" can be defined as being an extraction from the 4th byte to the 8 byte, and the "operating information" can be defined as being an extraction from the 9th byte to the 14 byte.

Moreover, for example, in a case where the collected data to be collected from the Company B-manufactured dump truck model Y is of the format illustrated in FIG. 2B, in the collected data, the "body model name" can be defined as being an extraction from the 0th byte to the third 3 byte, the "body identifier" can be defined as being an extraction from the 4th byte to the 8 byte, the "operating start time" can be defined as being an extraction from the 9th byte to the 14th byte, and the "operating end time" can be defined as being an extraction from the 15th byte to the 20th byte.

Accordingly, individual collected data are respectively configured in a format that is predetermined for that collected data, but it could be said that the data conversion definition is a definition for converting the collected data into information contained in that collected data.

The data conversion definition includes, for instance, at least three pieces of information of data conversion definition identifier, conversion item name and conversion method as shown in FIG. 3. The data conversion definition identifier represents the identifier that is unique to the data conversion definition corresponding to the collected data which is assigned to each type of collected data, and the conversion item name represents the item name of an item into which the corresponding collected data can be converted (referring to information that can be extracted from the corresponding collected data; this is hereinafter referred to as the "conversion item").

Moreover, the conversion method represents the method of converting the collected data into the corresponding conversion item with regard to which part of the corresponding collected data needs to be extracted to enable the conversion of that collected data into the corresponding conversion item. Note that the conversion method may be a method of only extracting a binary from the collected data as in this embodiment, or a method of converting the collected data into a character string of an arbitrary character code, or processing such as linking a plurality of conversion items may be performed.

Moreover, the term "virtual data conversion definition" is a result of compiling the plurality of related data conversion definitions into one virtual data conversion definition as described above. For example, the Company A-manufactured dump truck model X and the Company B-manufactured dump truck model Y can be compiled as one group of "dump trucks". A compilation of the data conversion definitions of the respective collected data of a plurality of related objects is the virtual data conversion definition. The virtual data conversion definition is also pre-set by the user.

The virtual data conversion definition includes, as shown in FIG. 4, the various pieces of information of a "virtual data conversion definition identifier", a "virtual conversion item name", a "data conversion definition identifier" and an "associating method".

The virtual data conversion definition identifier represents the identifier that is unique to the virtual data conversion definition which is assigned to each virtual data conversion definition, and the virtual conversion item name represents the name of the conversion item in the virtual data conversion definition (this conversion item is hereinafter referred to as the "virtual conversion item"). As the virtual conversion item, for example, selected is an information item that can be acquired from the collected data corresponding to each data conversion definition configuring the virtual data conversion definition.

Moreover, the data conversion definition identifier represents the data conversion definition identifier of the individual data conversion definition configuring the virtual data conversion definition, and the associating method represents the method of associating the corresponding virtual conversion item, and the conversion item in the corresponding data conversion definition.

FIG. 4 shows an example of a case where, in order to compile the Company A-manufactured dump truck model X, the Company B-manufactured dump truck model Y, . . . as a common concept of "dump trucks", the data conversion definitions of the collected data regarding these models have been complied as a virtual data conversion definition to which a virtual data conversion definition identifier of one "DUMP" has been assigned. As the virtual conversion items, "body model name", "body identifier" and "operating hours" have been defined.

The "body model name" as a dump truck has been virtualized by associating the "body model name" included in the collected data corresponding respectively to the Company A-manufactured dump truck model X and the Company B-manufactured dump truck model Y. Moreover, the "operating hours" as a dump truck has been virtualized by associating the "operating hours" included in the corresponding collected data regarding the Company A-manufactured dump truck model X, and virtualized by associating the difference between the "operating end time" and the "operating start time" included in the corresponding collected data regarding the Company B-manufactured dump truck model Y.

Meanwhile, the term "first retrieval condition" refers to the retrieval condition using the virtual data conversion definition and the virtual conversion item defined in the virtual data conversion definition. In cases where the foregoing virtual data conversion definition is set regarding FIG. 4, upon acquiring the operating hours of "dump trucks", the first retrieval condition can be represented, for example, in an SQL format as shown in FIG. 5A. The first retrieval condition shown in FIG. 5A is a condition of requesting, as the retrieval condition, that the "body model name", "body identifier" and "operating hours" of the corresponding object should be retrieved from the "collected data" in relation to the respective data conversion definitions configuring the virtual data conversion definition to which the virtual data conversion definition identifier of "DUMP" has been assigned. The data retrieval/distribution client 2 generates this kind of first retrieval condition of an SQL format according to the user's operation and sends the generated first retrieval condition to the data retrieval/distribution server 3.

Moreover, the term "second retrieval condition" refers to the retrieval condition which targets each of the individual data conversion definitions configuring the virtual data conversion definition, which is the subject of the first retrieval condition, and which is generated in the data retrieval/distribution server 3 based on the first retrieval condition. For example, in cases where the virtual data conversion definition is FIG. 4 and the first retrieval condition is FIG. 5A, the second retrieval condition in an SQL format as shown in FIG. 5B-1 and FIG. 5B-2 is generated based on the first retrieval condition for each data conversion definition configuring the virtual data conversion definition.

Note that the second retrieval condition shown in FIG. 5B-1 is a condition of requesting, as the retrieval condition, that the "body model name", "body identifier" and "operating hours" of the corresponding object should be retrieved from the "collected data" in relation to the data conversion definition to which the virtual data conversion definition identifier of "DUMP_A_X" has been assigned, and the second retrieval condition shown in FIG. 5B-2 is a condition of requesting, as the retrieval condition, that the "body model name", "body identifier" and "operating hours" of the corresponding object should be retrieved from the "collected data" in relation to the data conversion definition to which the virtual data conversion definition identifier of "DUMP_B_Y" has been assigned.

The generation of this kind of second retrieval condition based on the first retrieval condition is performed in the data retrieval/distribution server 3 that received a retrieval/distribution request from the data retrieval/distribution client 2. Subsequently, the data retrieval/distribution server 3 performs retrieval processing for each data conversion definition based on the generated second retrieval condition, aggregates the retrieval results as one retrieval result file FL as shown in FIG. 5C, and sends the retrieval result file FL to the data retrieval/distribution client 2 as the source of the retrieval/distribution request.

As means for realizing the data retrieval/distribution function according to this embodiment described above, the main storage device 22 of the data retrieval/distribution server 3 stores, as shown in FIG. 1, a retrieval/distribution request receiving unit 30, a retrieval condition generation unit 31, a retrieval execution unit 32, a retrieval result aggregation unit 33 and an aggregation result sending unit 34, and the auxiliary storage device 23 of the data retrieval/distribution server 3 is provided with a collected data storage area 35 and also stores a data conversion definition table 36, a virtual data conversion definition table 37 and a retrieval condition generation definition table 38.

The retrieval/distribution request receiving unit 30 is a program with a function of receiving and processing the retrieval/distribution request sent from the data retrieval/distribution client 2, and the retrieval condition generation unit 31 is a program with a function of creating a second retrieval condition for each corresponding data conversion definition from the first retrieval condition based on the virtual data conversion definition.

Moreover, the retrieval execution unit 32 is a program with a function of retrieving information which satisfies the second retrieval condition from the collected data storage area 35, and the retrieval result aggregation unit 33 is a program with a function of aggregating the information detected in the retrieval of the retrieval execution unit 32 into a single piece of information. Furthermore, the aggregation result sending unit 34 is a program with a function of sending the retrieval result, which was aggregated by the retrieval result aggregation unit 33, to the data retrieval/distribution client 2 that sent the corresponding retrieval/distribution request.

The collected data storage area 35 is a storage area for storing the collected data that was collected by the data retrieval/distribution server 3 from the data source, and is configured, as shown in FIG. 6, in the form of a table including a data conversion definition identifier column 35A and a collected data column 35B.

The data conversion definition identifier column 35A stores the data conversion definition identifier which was assigned to the data type of individual collected data, and the collected data column 35B sequentially stores the collected data of the data type to which the corresponding data conversion definition identifier has been assigned. The collected data is collected by the data retrieval/distribution server 3 from the data source periodically (for instance, every minute or every second) or randomly.

Note that it is also possible to store files in the collected data storage area 35, and sequentially register the collected data in those files. Moreover, the collected data may be aggregated into one table or file as in this embodiment, or stored by being distributed into a plurality of tables or files.

The data conversion definition table 36 is a table that is used for managing the foregoing data conversion definitions, and is configured by comprising, as shown in FIG. 3, a data conversion definition identifier column 36A, a conversion item name column 36B and a conversion method column 36C. The data conversion definition identifier column 36A stores the data conversion definition identifier that was assigned by the user to the respective collected data, and the conversion item name column 36B stores the item name of the conversion item into which the corresponding collected data can be converted. Furthermore, the conversion method column 36C stores the method of converting the corresponding collected data into the corresponding conversion item.

The virtual data conversion definition table 37 is table that is used for managing the foregoing virtual data conversion definitions, and is configured by comprising, as shown in FIG. 4, a virtual data conversion definition identifier column 37A, a virtual conversion item name column 37B, a data conversion definition identifier column 37C and an associating method column 37D.

The virtual data conversion definition identifier column 37A stores the virtual data conversion definition identifier that has been assigned to the individual virtual data conversion definitions, and the virtual conversion item name column 37B stores the item name of each virtual conversion item which has been defined regarding the corresponding virtual data conversion definition. Furthermore, the data conversion definition identifier column 37C stores the data conversion definition identifier of each data conversion definition configuring the corresponding virtual data conversion definition identifier, and the associating method column 37D stores the method of associating the corresponding data conversion definition with the corresponding virtual conversion item.

The retrieval condition generation definition table 38 is a table that is used for managing the generation method of generating the second retrieval condition based on each data conversion definition from the first retrieval condition based on the virtual data conversion definition, and is configured by comprising, as shown in FIG. 7, a virtual data conversion definition identifier column 38A, a data conversion definition identifier column 38B and a second retrieval condition generation method column 38C.

The virtual data conversion definition identifier column 38A stores each of the virtual data conversion definitions, and the data conversion definition identifier column 38B stores the data conversion definition identifier of each data conversion definition configuring the corresponding virtual data conversion definition. Moreover, the second retrieval condition generation method column 38C stores the method of generating the second retrieval condition of the individual data conversion definitions from the first retrieval condition in the corresponding virtual data conversion definition.

Meanwhile, the main storage device 12 (FIG. 1) of the data retrieval/distribution client 2 stores a retrieval/distribution request sending unit 40 and a retrieval/distribution result receiving unit 41. The retrieval/distribution request sending unit 40 is a program with a function of generating the first retrieval condition according to the user's operation and sending a retrieval/distribution request, including the generated first retrieval condition, to the data retrieval/distribution server 3. Moreover, the retrieval/distribution result receiving unit 41 is a program with a function of receiving the retrieval result of the retrieval processing executed in the data retrieval/distribution server 3 according to the retrieval/distribution request.

Note that, when the data retrieval/distribution client 2 periodically requests the data retrieval/distribution server 3 to perform retrieval processing under the same first retrieval condition, the first retrieval condition is retained in the auxiliary storage device 13 of the data retrieval/distribution client 2 as needed.

(1-3) Various Types of Processing Related to Data Retrieval/Distribution Function of this Embodiment The specific processing contents of the various types of processing to be executed in the data retrieval/distribution server 3 in relation to the data retrieval/distribution function of this embodiment are now explained. Note that, in the ensuing explanation, while the processing entity of the various types of processing is explained as a program ("[ ] unit"), in effect, it goes without saying that the CPU 21 (FIG. 1) of the data retrieval/distribution server 3 executes the processing based on the program.

(1-3-1) Data Retrieval/Distribution Processing

Figure 8:
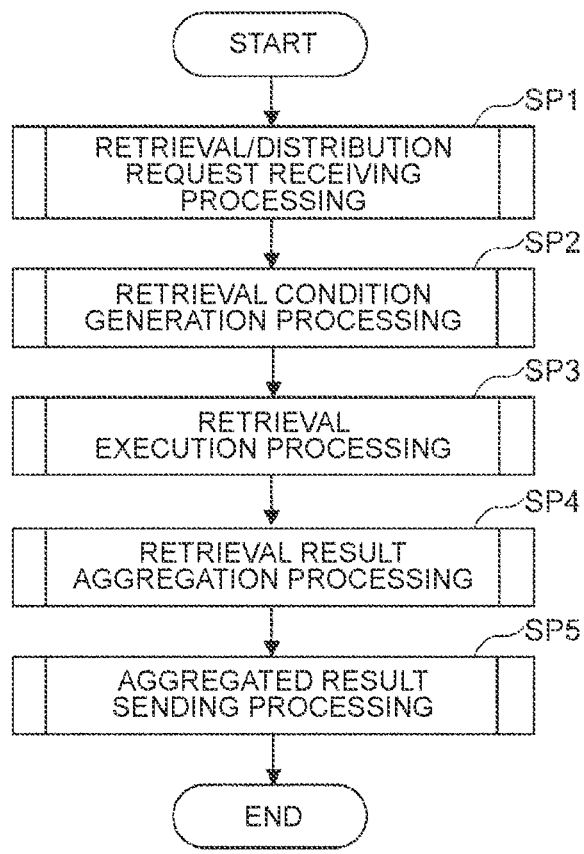
FIG. 8 is a flowchart showing a processing routine of the data retrieval/distribution processing.

FIG. 8 shows the processing routine of the data retrieval/distribution processing to be executed in the data retrieval/distribution server 3 that received the retrieval/distribution request from the data retrieval/distribution client 2 in relation to the data retrieval/distribution function of this embodiment.

When the data retrieval/distribution server 3 receives a retrieval/distribution request from the data retrieval/distribution client 2, the data retrieval/distribution processing is started, and, foremost, the retrieval/distribution request receiving unit 30 (FIG. 1) executes the reception processing for receiving the retrieval/distribution request (SP1).

Subsequently, the retrieval condition generation processing of generating a second retrieval condition based on the first retrieval condition is executed by the retrieval condition generation unit 31 (FIG. 1) based on the first retrieval condition included in the retrieval/distribution request received in step SP1 (SP2).

Next, the retrieval execution processing of executing the retrieval processing based on the second retrieval condition generated in step SP2 is executed by the retrieval execution unit 32 (FIG. 1) (SP3), and, thereafter, the retrieval result aggregation processing of aggregating the processing results of the retrieval execution processing of step SP3 into a single result is executed by the retrieval result aggregation unit 33 (FIG. 1) (SP4).

Furthermore, the aggregation result sending processing of sending the retrieval result file FL described above with reference to FIG. 5C which was created in the retrieval result aggregation processing of step SP4 to the data retrieval/distribution client 2 as the source of the retrieval/distribution request is executed by the aggregation result sending processing unit (SP5), and the data retrieval/distribution processing is thereafter ended.

(1-3-2) Retrieval Condition Generation Processing

Figure 9:
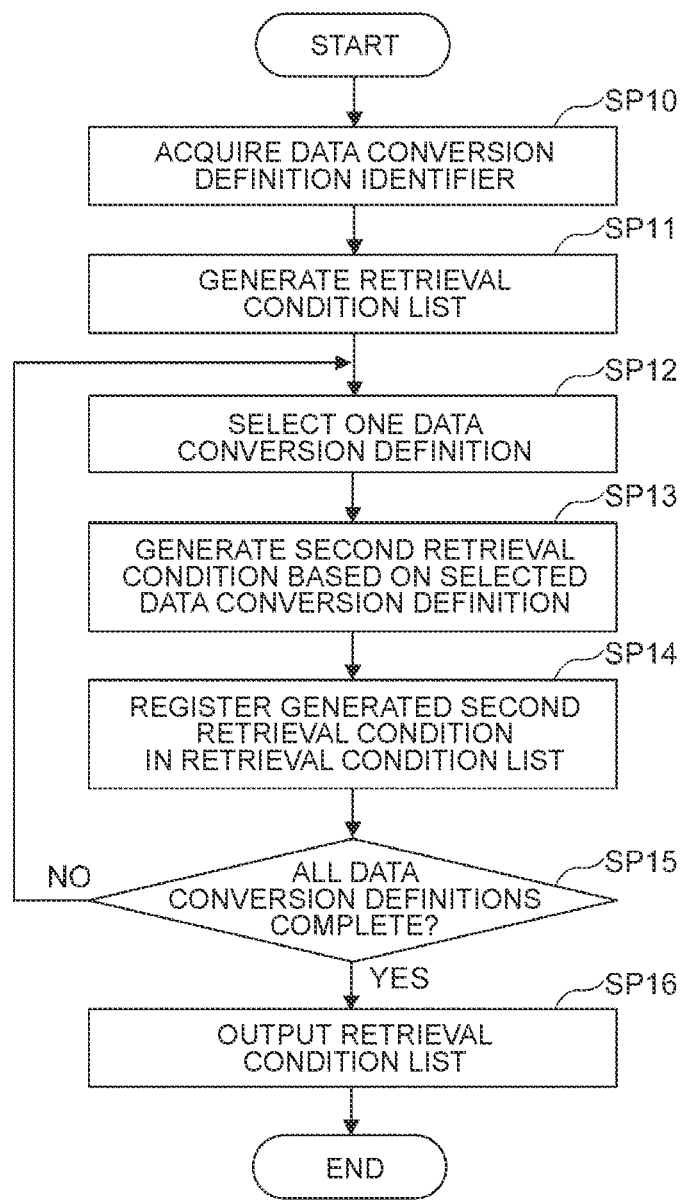
FIG. 9 is a flowchart showing a processing routine of the retrieval condition generation processing according to the first embodiment.

FIG. 9 shows the specific processing contents of the retrieval condition generation processing to be executed by the retrieval condition generation unit 31 in step SP2 of the retrieval condition generation processing.

When the retrieval condition generation unit 31 receives, from the retrieval/distribution request receiving unit 30, the first retrieval condition included in the retrieval/distribution request sent from the data retrieval/distribution client 2, the retrieval condition generation unit 31 starts the retrieval condition generation processing and foremost refers to the virtual data conversion definition table 37 (FIG. 4), and acquires the data conversion definition identifier of all data conversion definitions configuring the corresponding virtual data conversion definition (SP10).

Subsequently, the retrieval condition generation unit 31 generates an empty retrieval condition list (not shown) (SP11), and thereafter selects one data conversion definition among the data conversions definitions for which the data conversion definition identifier was acquired in step SP10 (SP12).

Next, the retrieval condition generation unit 31 generates a second retrieval condition based on the first retrieval condition included in the acquired retrieval/distribution request regard to the data conversion definition selected in step SP12 while referring to the retrieval condition generation definition table 38 (FIG. 7) (SP13), and registers the generated second retrieval condition in the retrieval condition list which was generated in step SP11 (SP14).

Thereafter, the retrieval condition generation unit 31 determines whether the processing of step SP13 and step SP14 has been executed for all data conversion definitions for which the data conversion definition identifier has been acquired in step SP10 (SP15). When the retrieval condition generation unit 31 obtains a negative result in this determination, the retrieval condition generation unit 31 returns to step SP12, and thereafter repeats the processing of step SP12 to step SP15 while sequentially switching the data conversion definition selected in step SP12 to another unprocessed data conversion definition.

When the retrieval condition generation unit 31 eventually obtains a positive result in step SP15 as a result of completing the generation of the second retrieval condition for all data conversion definitions for which the data conversion definition identifier has been acquired in step SP10, the retrieval condition generation unit 31 outputs the retrieval condition list to the retrieval execution unit 32 (FIG. 1) (SP16), and thereafter ends the retrieval condition generation processing.

(1-3-3) Retrieval Execution Processing

Figure 10:
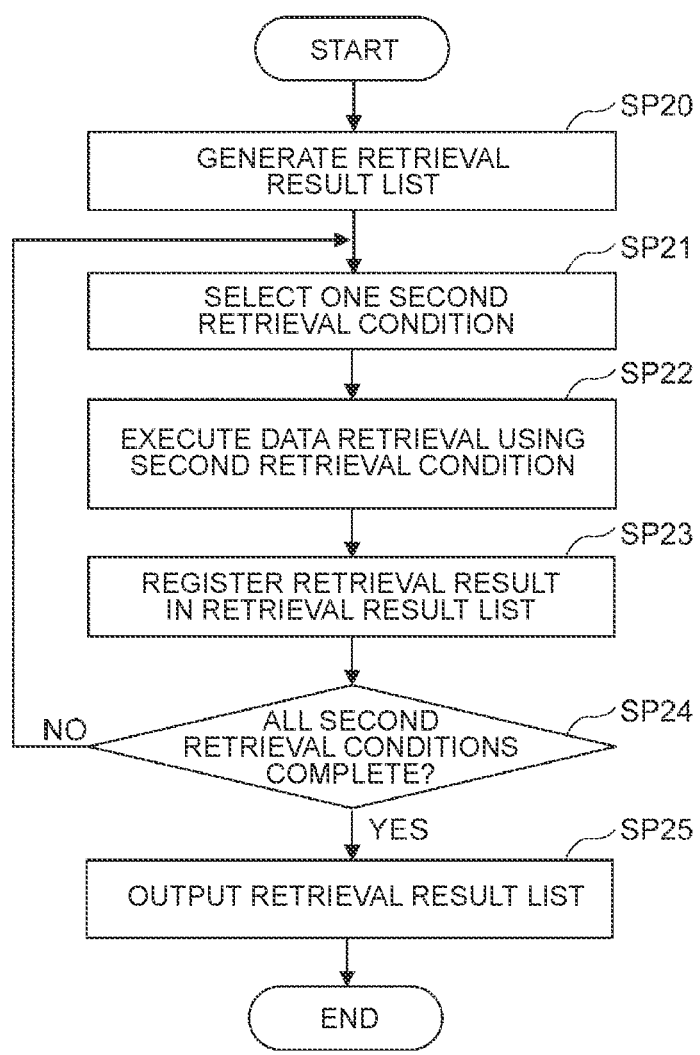
FIG. 10 is a flowchart showing a processing routine of the retrieval execution processing.

Meanwhile, FIG. 10 shows the specific processing contents of the retrieval execution processing to be executed by the retrieval execution unit 32 in step SP3 of the retrieval condition generation processing described above with reference to FIG. 8.

When the retrieval execution unit 32 receives the foregoing retrieval condition list provided by the retrieval condition generation unit 31, the retrieval execution unit 32 starts the retrieval execution processing, and foremost generates an empty retrieval result list (not shown) (SP20), and thereafter selects one second retrieval condition among the second retrieval conditions registered in the received retrieval condition list (SP21).

Subsequently, the retrieval execution unit 32 executes the data retrieval using the second retrieval condition selected in step SP21 to the collected data stored in the collected data storage area 35 (FIG. 1) (SP22). Specifically, the retrieval execution unit 32 refers to the data conversion definition table 36 described above with reference to FIG. 3, and retrieves information which satisfies the second retrieval condition from the collected data of the data conversion definition corresponding to the second retrieval condition selected in step SP21.

For instance, in the examples shown in FIG. 2 to FIG. 4, in the case of acquiring the operating hours of the Company A-manufactured dump truck, retrieval processing is performed based on the following procedures of "1" to "3".

1. Acquire the collected data in which the data conversion definition identifier is "DUMP_A_X" among the collected data stored in the collected data storage area 35.
2. Refer to the data conversion definition table 36 (FIG. 3) and acquire the conversion method of the operating hours, and covert the collected data acquired in "1" above into the distribution format (conversion item) according to the acquired conversion method.
3. Extract the collected data which satisfies the second retrieval condition among the collected data that was converted in "2" above.

Subsequently, the retrieval execution unit 32 registers the retrieval result of the retrieval processing in the retrieval result list that was generated in step SP20 (SP23).

Thereafter, the retrieval execution unit 32 determines whether the processing of step SP22 and step SP23 has been executed for all second retrieval conditions registered in the received retrieval condition list (SP24). When the retrieval execution unit 32 obtains a negative result in this determination, the retrieval execution unit 32 returns to step SP21, and thereafter repeats the processing of step SP21 to step SP24 while sequentially switching the second retrieval condition selected in step SP21 to another unprocessed second retrieval condition.

When the retrieval execution unit 32 eventually obtains a positive result in step SP24 as a result of obtaining the retrieval result of all second retrieval conditions registered in the received retrieval condition list, the retrieval execution unit 32 outputs the retrieval result list to the retrieval result aggregation unit 33 (FIG. 1) (SP25), and thereafter ends the retrieval execution processing.

(1-3-4) Retrieval Result Aggregation Processing

Figure 11:
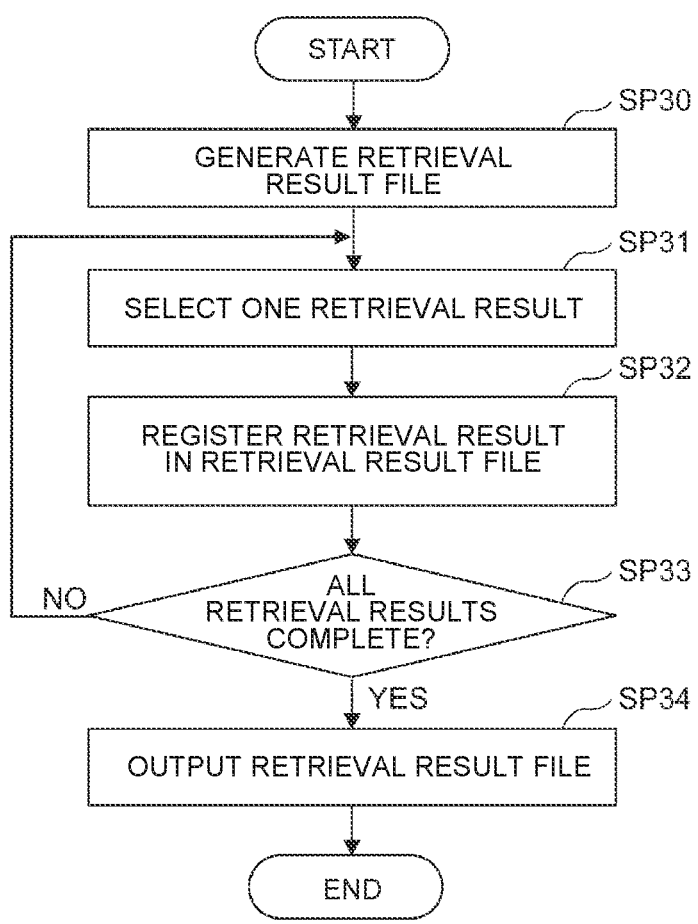
FIG. 11 is a flowchart showing a processing routine of the retrieval result aggregation processing.

Meanwhile, FIG. 11 shows the specific processing contents of the retrieval result aggregation processing to be executed by the retrieval result aggregation unit 33 in step SP4 of the retrieval condition generation processing described above with reference to FIG. 8.

When the retrieval result aggregation unit 33 receives the foregoing retrieval result list provided by the retrieval execution unit 32, the retrieval result aggregation unit 33 starts the retrieval result aggregation processing, and foremost generates an empty retrieval result file FL (FIG. 5C) (SP30). Subsequently, the retrieval result aggregation unit 33 selects one retrieval result registered in the retrieval result list (SP31), and registers the selected retrieval result in the retrieval result file that was generated in step SP30 (SP32).

Thereafter, the retrieval result aggregation unit 33 determines whether the processing of step SP32 has been executed for all retrieval results registered in the received retrieval result list (SP33). When the retrieval result aggregation unit 33 obtains a negative result in this determination, the retrieval result aggregation unit 33 returns to step SP31, and thereafter repeats the processing of step SP31 to step SP33 while sequentially switching the retrieval result selected in step SP31 to another unprocessed retrieval result.

When the retrieval result aggregation unit 33 eventually obtains a positive result in step SP33 as a result of completing the aggregation of all retrieval results registered in the received retrieval result list, the retrieval result aggregation unit 33 outputs the retrieval result file FL to the aggregation result sending unit 34 (SP34), and thereafter ends the retrieval result aggregation processing.

(1-4) Effect of this Embodiment

As described above, with the data retrieval/distribution system 1 of this embodiment, data retrieval can be performed based on a second retrieval condition using a virtual data conversion definition, which is a result of compiling a plurality of related data conversion definitions into one virtual data conversion definition.

Thus, according to the data retrieval/distribution system 1 of the present invention, even in cases of adding, as a retrieval target, collected data of a new data format that differs from the data format of existing collected data, there is no need to modify the application loaded in the data retrieval/distribution server 3 or the application loaded in the data retrieval/distribution client 2, and the situation can be dealt with merely by defining the correspondence relation of the respective virtual conversion items of the virtual data conversion definition and the conversion items of the individual data conversion definitions.

Moreover, according to the data retrieval/distribution system 1 of the present invention, merely by setting a virtual data conversion definition from the intended perspective, it is possible to perform a batch retrieval from an abstract perspective such as "dump trucks" or "loading shovels" or change the perspective of data retrieval in an ad hoc manner.

Thus, according to the data retrieval/distribution system 1 of the present invention, by performing this kind of retrieval processing, it is possible to remarkably improve the user-friendliness of a data retrieval/distribution system in comparison to a conventional data retrieval/distribution system.

(2) Second Embodiment

Figure 12:
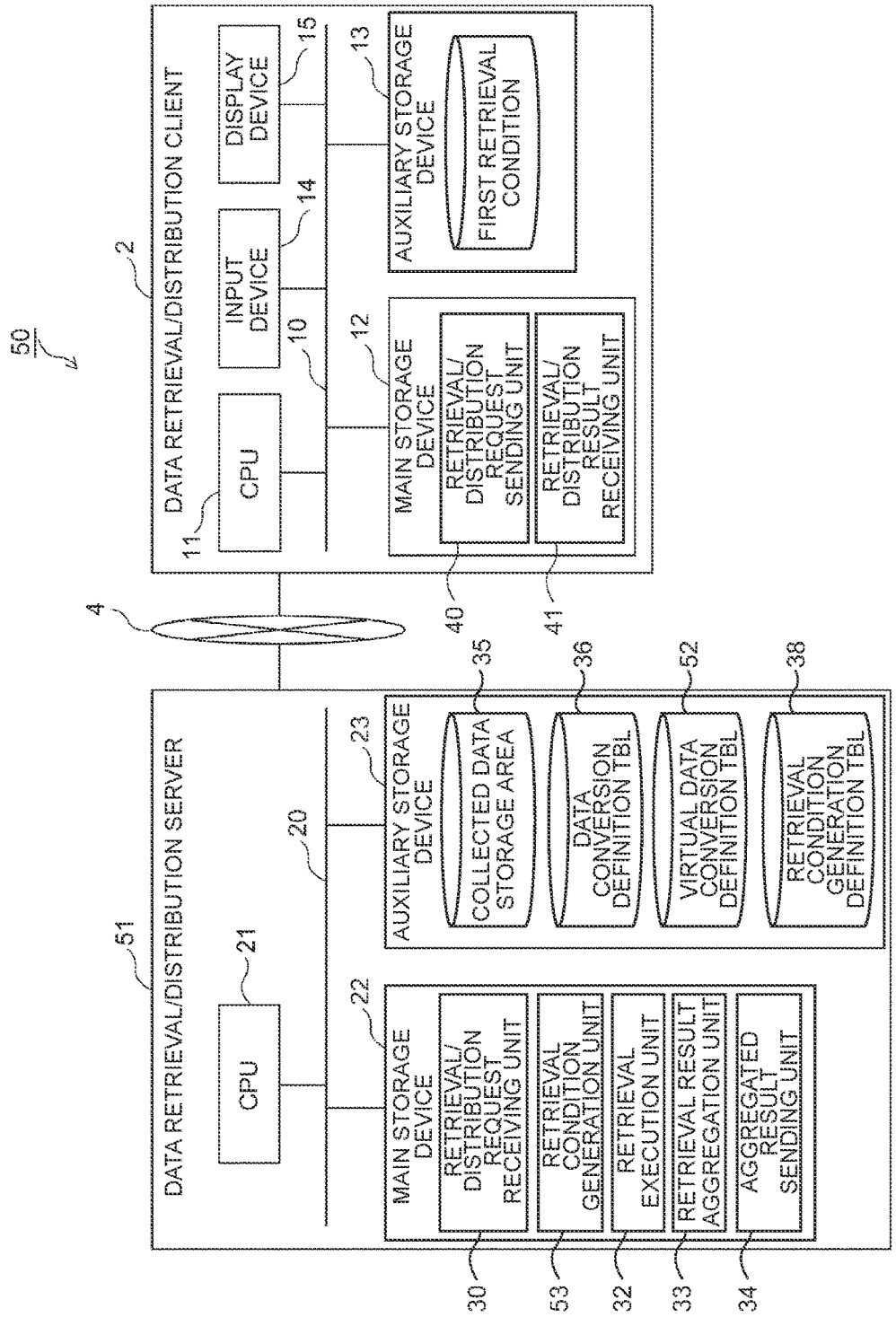
FIG. 12 is a block diagram showing a schematic configuration of the data retrieval/distribution system according to the second embodiment.

FIG. 12, in which the components corresponding to those of FIG. 1 are given the same reference numeral, shows a data retrieval/distribution system 50 according to the second embodiment. The data retrieval/distribution system 50 differs from the data retrieval/distribution system 1 of the first embodiment with respect to the point that the relation of the data conversion definitions is defined so that the virtualization of the data conversion definitions can be realized in multiple hierarchies (these hierarchies are hereinafter referred to as the "virtual hierarchies"), and the point that the second retrieval condition is generated from the first retrieval condition in light of the hierarchization of the virtual data conversion definitions.

For example, "dump trucks" and "loading shovels" can be compiled as "construction machinery". Thus, in this embodiment, the data conversion definition obtained by virtualizing the collected data from "dump trucks" (virtual data conversion definition identifier: "DUMP") and the data conversion definition obtained by virtualizing the collected data from "loading shovels" (virtual data conversion definition identifier: "SHOVEL") are virtualized as the collected data from "construction machinery".

As the measures for performing the foregoing virtualization, the virtual data conversion definition table 52 of this embodiment is provided with a virtual applicability column 52E in addition to the virtual data conversion definition identifier column 52A, the virtual conversion item name column 52B, the data conversion definition identifier column 52C and the associating method column 52D as shown in FIG. 13.

The virtual data conversion definition identifier column 52A, the virtual conversion item name column 52B, the data conversion definition identifier column 52C and the associating method column 52D store the same information as the information that is stored in the virtual data conversion definition identifier column 37A, the virtual conversion item name column 37B, the data conversion definition identifier column 37C and the associating method column 37D of the virtual data conversion definition table 37 of the first embodiment described above with reference to FIG. 4.

However, in this embodiment, the relation of the data conversion definitions is defined so that the virtualization of the data conversion definitions can be realized in multiple hierarchies as described above. Thus, a flag which represents whether the data conversion definition associated with the corresponding data conversion definition is a virtual data conversion definition (this flag is hereinafter referred to as the "virtual applicability flag") is stored in the virtual applicability column 52E.

For example, when virtualizing "dump trucks" and "loading shovels" as "construction machinery" as described above, since the "Company A-manufactured dump truck model X" (data conversion definition identifier: "DUMP_A_X") and the "Company C-manufactured loading shovel model Z" (data conversion definition identifier: "SHOVEL_C_Z") to be virtualized as "dump trucks" are not a virtual data conversion definition, the virtual applicability flag stored in the virtual applicability column 52E is set to "not applicable" which represents that the corresponding data conversion definition is not a virtual data conversion definition.

Meanwhile, since "dump truck" (data conversion definition identifier: "DUMP") and "loading shovel" (data conversion definition identifier: "SHOVEL") to be virtualized as "construction machinery" (data conversion definition identifier: "CONSTRUCTION_MACHINE") are a virtual data conversion definition, the virtual applicability flag stored in the virtual applicability column 52E is set to "applicable" which represents that the corresponding data conversion definition is a virtual data conversion definition.

Note that the virtual data conversion definition table 52 is created by the user in advance.

Figure 14:
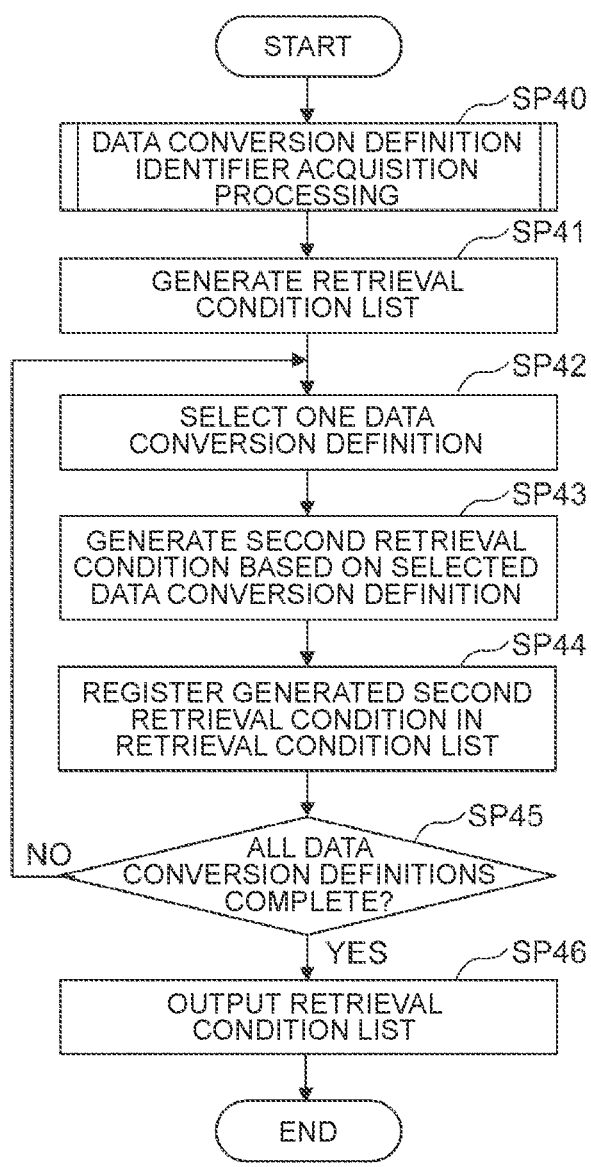
FIG. 14 is a flowchart showing a processing routine of the retrieval condition generation processing according to the second embodiment.

FIG. 14 shows the processing routine of the retrieval condition generation processing to be executed by the retrieval condition generation unit 53 (FIG. 12) of this embodiment in substitute for the retrieval condition generation processing of the first embodiment described above with reference to FIG. 9.

When the retrieval condition generation unit 53 receives, from the retrieval/distribution request receiving unit 30, the first retrieval condition included in the retrieval/distribution request sent from the data retrieval/distribution client 2, the retrieval condition generation unit 53 starts the retrieval condition generation processing, and foremost refers to the virtual data conversion definition table 52 (FIG. 13) and acquires the data conversion definition identifier of all data conversion definitions configuring the virtual data conversion definition designated in the first retrieval condition (SP40).

In effect, when the virtual data conversion definition designated in the first retrieval condition is configured from several lower tier virtual data conversion definitions, in step SP40, the retrieval condition generation unit 53 acquires the data conversion definition identifier (including the virtual data conversion definition identifier) of all data conversion definitions (including virtual data conversion definitions) respectively configuring the virtual data conversion definitions. Moreover, the retrieval condition generation unit 53 acquires the data conversion definition identifier (including the virtual data conversion definition identifier) of the data conversion definitions (including virtual data conversion definitions) in which the foregoing data conversion definitions are of an even lower tier. The retrieval condition 53 acquires the data conversion definition identifier of all data conversion definitions configuring the virtual data conversion definition designated in the first retrieval condition by repeating the same processing until a virtual data conversion definition no longer exists in the end.

Thereafter, the retrieval condition generation unit 53 performs the processing of step SP42 to step SP46 in the same manner as the processing of step SP16 to step SP16 in the retrieval condition generation processing of the first embodiment, and there after ends the retrieval condition generation processing.

Figure 15:
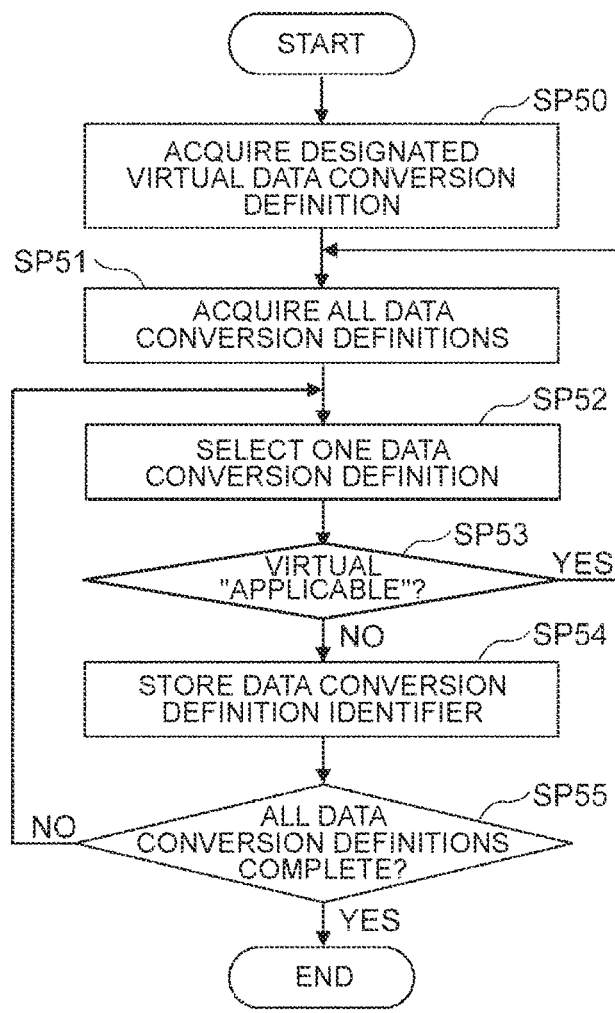
FIG. 15 is a flowchart showing a processing routine of the data conversion definition identifier acquisition processing.

FIG. 15 shows the specific processing contents of the data conversion definition identifier acquisition processing to be executed by the retrieval condition generation unit 53 in step SP40 of the retrieval condition generation processing (FIG. 14). When the retrieval condition generation unit 53 proceeds to step SP40 of the retrieval condition generation processing, the retrieval condition generation unit 53 starts the data conversion definition identifier acquisition processing shown in FIG. 15, and foremost acquires the virtual data conversion definition designated in the first retrieval condition (SP50).

Subsequently, the retrieval condition generation unit 53 refers to the virtual data conversion definition table 37 (FIG. 4) and acquires the data conversion definition identifier (including the virtual data conversion definition identifier) of all data conversion definitions (including virtual data conversion definitions) configuring the virtual data conversion definition acquired in step SP50 (SP51).

Next, the retrieval condition generation unit 53 selects one data conversion definition which has not been subject to the processing of step SP53 onward among the data conversion definitions for which the data conversion definition identifier was acquired in step SP51 (SP52), and determines whether the virtual applicability flag of the selected data conversion definition is "applicable" by referring to the virtual data conversion definition table 52 (SP53).

To obtain a negative result in this determination means that the data conversion definition selected in immediately preceding step SP52 is a virtual data conversion definition. Consequently, in this case, the retrieval condition generation unit 53 returns to step SP51 and thereafter executes the processing of step SP51 in the same manner as described above. However, when the retrieval condition generation unit 53 obtains a negative result in step SP53 and returns to step SP51, the retrieval condition generation unit 53 collectively manages the data conversion definition identifier acquired in current step SP51 and the data conversion definition acquired in previous step SP51, and selects one data conversion definition among these data conversion definitions in step SP52.

Meanwhile, to obtain a positive result in the determination of step SP53 means that the data conversion definition selected in immediately preceding step SP52 is not a virtual data conversion definition (is a normal data conversion definition). Consequently, in this case, the retrieval condition generation unit 53 stores the data conversion definition identifier of the data conversion definition (data conversion definition selected in immediately preceding step SP52) (SP54).

Subsequently, the retrieval condition generation unit 53 determines whether the processing of step SP53 and step SP54 has been executed for all data conversion definitions previously acquired in step SP51 (SP55). When the retrieval condition generation unit 53 obtains a negative result in this determination, the retrieval condition generation unit 53 returns to step SP51, and thereafter repeats the processing of step SP51 to step SP55.

When the retrieval condition generation unit 53 eventually obtains a positive result in step SP55 as a result of acquiring the data conversion definition identifier of all data conversion definitions configuring the virtual data conversion definition designated in the first retrieval condition, the retrieval condition generation unit 53 ends the data conversion definition identifier acquisition processing and returns to the retrieval condition generation processing of FIG. 14, and thereafter returns to step SP41 of the retrieval condition generation processing.

Accordingly, with the data retrieval/distribution system 50 of this embodiment, since it is possible to set the virtual data conversion definition to realize multiple virtual hierarchies, it is possible to perform a batch retrieval from a more abstract perspective or change the perspective of data retrieval in an ad hoc manner.

Thus, according to the data retrieval/distribution system 50 of the present invention, it is possible to further improve the user-friendliness of a data retrieval/distribution system in comparison to the data retrieval/distribution system 1 of the first embodiment.

(3) Third Embodiment

With the data retrieval/distribution system 1, 50 of the first and second embodiments, as described above with reference to FIG. 10, since retrieval processing is performed while converting the collected data corresponding to the target data conversion definition into the distribution format by referring to the data conversion definition table 36 in step SP22 of the retrieval execution processing, only the virtual data conversion definition needs to be changed even in cases where the method of retrieval or the format upon using data is changed. Meanwhile, since retrieval processing is performed while converting the collected data corresponding to the data conversion definition into the distribution format, there is a problem in that the time required for performing the retrieval execution processing will be prolonged by that much.

As a means for shorting the retrieval execution processing time, considered may be a method of converting, in advance, the collected data corresponding to each of the data conversion definitions or the virtual data conversion definitions into the distribution format at the time of acquisition thereof. However, in the foregoing case, when the virtual data conversion definition is changed, the corresponding collected data needs to be converted into the distribution format in connection with the new virtual data conversion definition, the data conversion processing that was executed regarding the old virtual data conversion definition will become a waste.

Whether to attach importance on the flexibility in response to changes or the shortening of the retrieval execution time will depend on the purpose of use of the data retrieval/distribution system.

Thus, in this embodiment, proposed is a data retrieval/distribution system capable of controlling the execution timing of the data conversion processing of converting the collected data into the distribution format for each data conversion definition. Note that, in the ensuing explanation, the explanation is provided on the premise that the execution timing of the data conversion processing performed to each data conversion definition and each virtual data conversion definition defined in the conversion timing definition table 62 is set to either the time of distribution or the time of collection.

Figure 16:
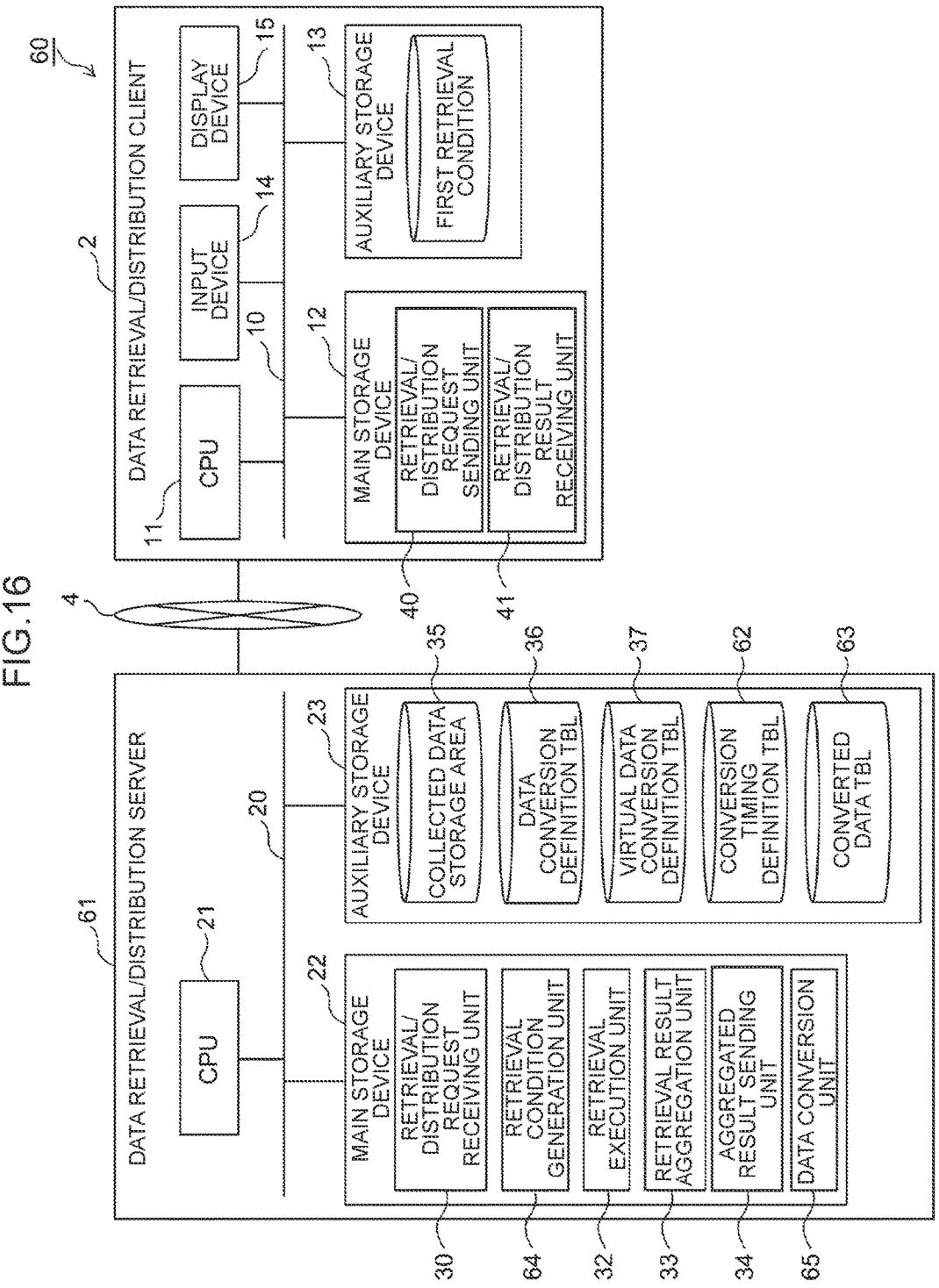
FIG. 16 is a block diagram showing a schematic configuration of the data retrieval/distribution system according to the third embodiment.

FIG. 16, in which the components corresponding to those of FIG. 1 are given the same reference numeral, shows a data retrieval/distribution system 60 according to the third embodiment equipped with the foregoing function. With the data retrieval/distribution system 60, as the means for performing the timing control of the data conversion processing described above, a conversion timing definition table 62 and a converted data table 63 are stored in the auxiliary storage device 23 of the data retrieval/distribution server 61 in addition to the data conversion definition table 36 and the virtual data conversion definition table 37.

The conversion timing definition table 62 is a table that defines the execution timing of the conversion processing for each data conversion definition or each virtual data conversion definition, and is created by the user in advance. The conversion timing definition table 62 is configured, as shown in FIG. 17, from a conversion definition identifier column 62A and a conversion timing column 62B.

The conversion definition identifier column 62A stores the data conversion definition identifier of all data conversion definitions and virtual data conversion definitions, and the conversion timing column 62B stores the timing of converting the data conversion definition or the virtual data conversion definition associated with the corresponding data conversion definition identifier into the distribution format.

Accordingly, in the example of FIG. 17, with regard to the collected data (data conversion definition identifier: DUMP_A_X) that was collected from the Company A-manufactured dump truck model X, it is defined that the collected data should be converted at the timing that the collected data was collected, and with regard to the collected data (virtual data conversion definition identifier: DUMP) that was virtualized as the collected data collected from dump trucks, it is defined that only the conversion times intended by the data user should be converted at the timing that the collected data is to be distributed.

Note that the executing timing of the data conversion processing may be defined, for example, such that the conversion is executed in an event-driven manner at the timing that the data was collected from the data source, or defined such that the conversion is executed on demand at the timing that the data is distributed to the data user, or defined such that the conversion is executed at a different timing.

Moreover, the conversion timing of the virtual data conversion definition identifier may be set to be at the time of collection only when the conversion timing that is set in the data conversion definition related to the virtual data conversion definition is set to be at the time of collection.

The converted data table 63 is a table for storing and retaining the collected data that was converted into the distribution format (this data is hereinafter referred to as the "converted data") according to the execution timing of the data conversion processing stored in the conversion timing definition table 62, and is configured by comprising, as shown in FIG. 18, a conversion definition identifier column 63A and a plurality of conversion item columns 63B.

The conversion definition identifier column 63A stores the data conversion definition identifier of the individual converted data, and each conversion item column 63B stores the value of the corresponding conversion item ("body model name", "body identifier" and "operating hours").

Note that the converted data may be stored and retained in a table as in this embodiment, or stored and retained in a file. Moreover, the converted data may be aggregated into one table or file as in this embodiment, or stored by being distributed into a plurality of tables or files.

Figure 19:
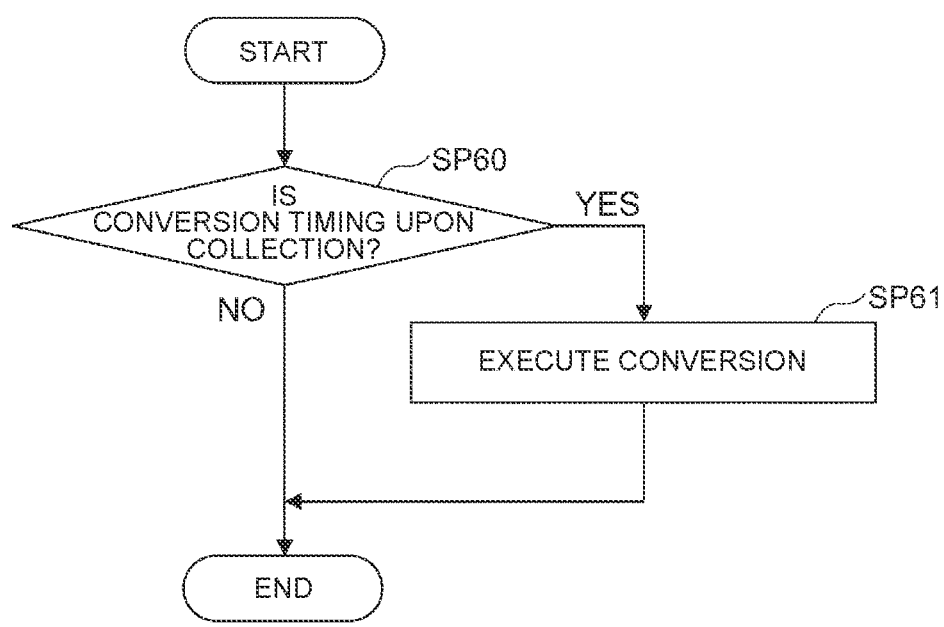
FIG. 19 is a flowchart showing a processing routine of the data conversion processing.

FIG. 19 shows the processing contents of the data conversion processing to be executed by the data conversion unit 65 at the time that the collected data is collected. When the data retrieval/distribution server 61 receives data from the data source or the like, the data conversion unit 65 starts the data conversion processing, and foremost refers to the conversion timing definition table 62 and determines whether the conversion timing of the received collected data is at the time of collection (SP60).

When the data conversion unit 65 obtains a negative result in this determination, the data conversion unit 65 stores the collected data in the collected data storage area 35 (FIG. 16) without converting the collected data into the distribution format, and thereafter ends the data conversion processing.

Meanwhile, when the data conversion unit 65 obtains a positive result in the determination of step SP60, the data conversion unit 65 converts the collected data into the distribution format and stores the converted collected data into the converted data table 63 (SP61), and thereafter ends the data conversion processing.

Figure 20:
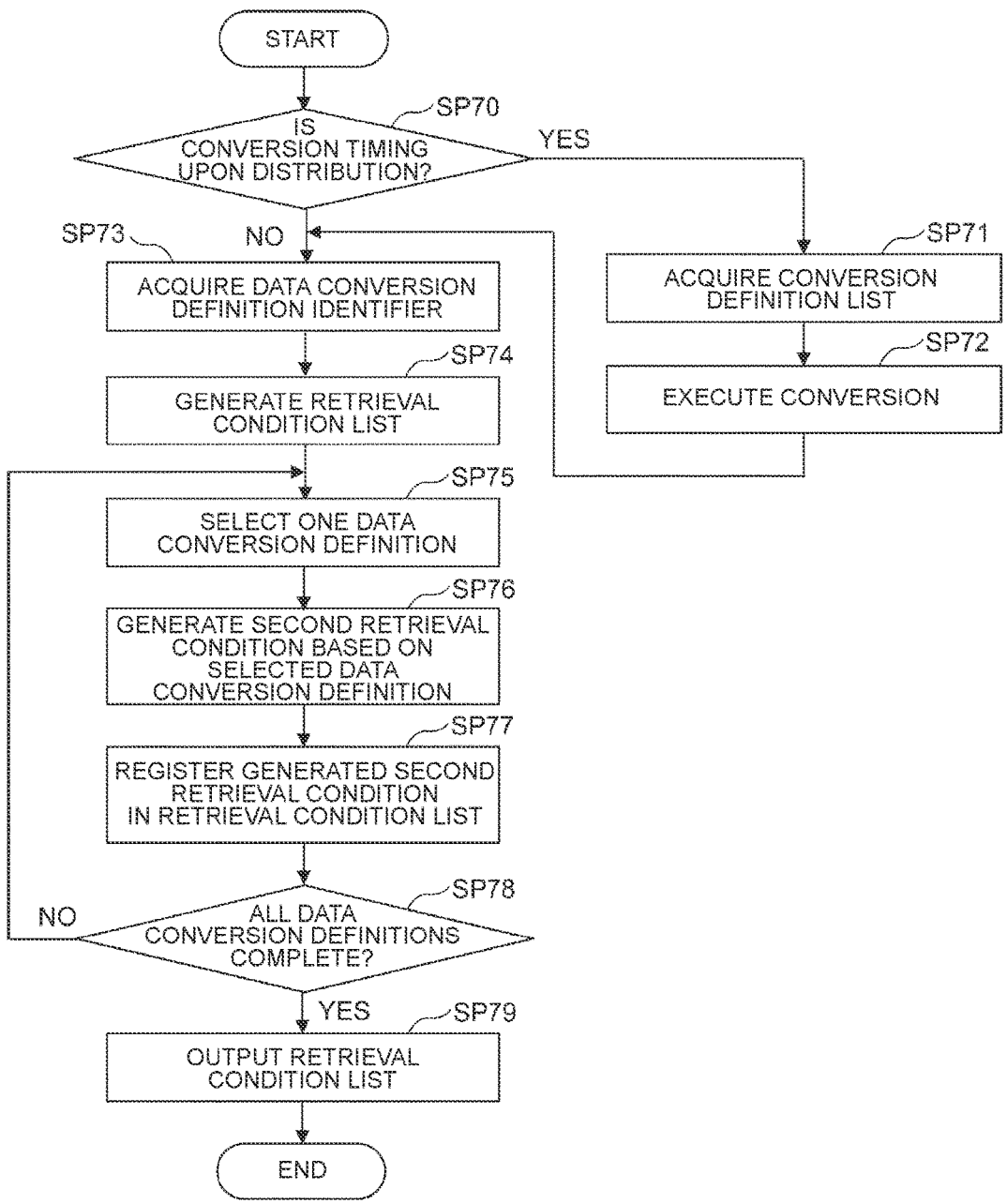
FIG. 20 is a flowchart showing a processing routine of the retrieval condition generation processing according to the third embodiment.

Meanwhile, FIG. 20 shows the processing routine of the retrieval condition generation processing to be executed by the retrieval condition generation unit 64 (FIG. 16) of this embodiment in substitute for the retrieval condition generation processing of the first embodiment described above with reference to FIG. 9.

When the retrieval condition generation unit 64 receives, from the retrieval/distribution request receiving unit 30, the first retrieval condition included in the retrieval/distribution request sent from the data retrieval/distribution client 2, the retrieval condition generation unit 64 starts the retrieval condition generation processing, and foremost refers to the conversion timing definition table 62 and determines whether the conversion timing of the data conversion definition or virtual data conversion definition of data to be retrieved designated in the first retrieval request is at the time of distribution (SP70).

When the retrieval condition generation unit 64 obtains a negative result in this determination, the retrieval condition generation unit performs step SP73 to step SP79 in the same manner as step SP10 to step SP16 in the retrieval condition generation processing of the first embodiment described above with reference to FIG. 9, and thereafter ends the retrieval condition generation processing.

Meanwhile, when the retrieval condition generation unit 64 obtains a positive result in the determination of step SP70, the retrieval condition generation unit 64 acquires, from the virtual data conversion definition table 37 described above with reference to FIG. 4, all data conversion definitions registered in the virtual data conversion definition table 37 (SP71).

Subsequently, the retrieval condition generation unit 64 executes the data conversion processing of converting the format of the collected data, in which the conversion timing thereof was set to the time of distribution, into the distribution format based on the data conversion definition acquired in step SP71, and stores the converted data in the converted data table 63 (SP72).

Note that, for example, in the case of FIG. 17, in cases where the target is a virtual data conversion definition indicated as "DUMP" and the virtual data conversion definition of "DUMP" is configured only from the data conversion definition of "DUMP_A_X" and the data conversion definition of "DUMP_B_Y" (refer to FIG. 17), no processing is performed in step SP72. However, when the virtual data conversion definition of "DUMP" is further configured from the data conversion definition of "DUMP_C_Z" and the data conversion timing of the data conversion definition of "DUMP_C_Z" is set to "time of distribution", the data conversion definition of "DUMP_C_Z" will be converted into the distribution format at the timing of step SP72.

Subsequently, the retrieval condition generation unit 64 processes step SP73 to step SP79 in the same manner as step SP10 to step SP16 in the retrieval condition generation processing of the first embodiment described above with reference to FIG. 9, and thereafter ends the retrieval condition generation processing.

In the case of this embodiment, since the collected data is converted into the distribution format at the time of collection or at the time of distribution as described above, retrieval is carried out without performing the data conversion processing of converting the collected data into the distribution format in step SP22 of the retrieval execution processing described above with reference to FIG. 10.

With the data retrieval/distribution system 60 of this embodiment described above, since it is possible to control the execution timing of the data conversion processing of converting the collected data into the distribution format for each data conversion definition or each virtual data conversion definition, in addition to the effects yielded in the first embodiment, it is possible to yield the effect of being able to shorten the execution time of the retrieval execution processing.

(4) Other Embodiments

Note that, while foregoing first to third embodiments described a case where the data conversion definitions and the virtual data conversion definitions are managed by being stored in a database table (data conversion definition table 36 or virtual data conversion definition table 37, 52), the present invention is not limited thereto, and the data conversion definitions and the virtual data conversion definitions may also be managed by being stored in a file. Moreover, the data conversion definitions may be stored in one table or file as in the first to third embodiments, or stored by being distributed into a plurality of tables or files.

Moreover, while the foregoing first to third embodiments described a case where the data format of the collected data is a fixed length binary format as illustrated in FIG. 2A and FIG. 2B, the present invention is not limited thereto, and the data format of the collected data may also be a variable length binary format, or a file format such as CSA.

Furthermore, while the foregoing first to third embodiments described a case of applying the main storage device 22 configured, for example, from a semiconductor memory as the storage medium for storing the programs for causing the data retrieval/distribution server 3, 51, 61 to execute various types of processing, the present invention is not limited thereto, and a disk-shaped storage medium such as a CD (Compact Disk) or a DVD (Digital Versatile Disk) or any other form of storage medium may also be used as the storage medium for storing the foregoing programs.

INDUSTRIAL APPLICABILITY

The present invention can be broadly applied to various types of data retrieval/distribution apparatuses.

REFERENCE SIGNS LIST 1, 50, 60: data retrieval/distribution system
2: data retrieval/distribution client
3, 51, 61: data retrieval/distribution server
21: CPU
22: main storage device
23: auxiliary storage device
30: retrieval/distribution request receiving unit
31, 53, 64: retrieval condition generation unit
32: retrieval execution unit
33: retrieval result aggregation unit
34: aggregation result sending unit
35: aggregated data storage area
36: data conversion definition table
37, 52: virtual data conversion definition table
38: retrieval condition generation definition table
62: conversion timing definition table
63: converted data table
65: data conversion unit
FL: retrieval result file

The invention claimed is:

1. A data retrieval/distribution method to be executed in a data retrieval/distribution server which collects data from a data source, accumulates the data that was collected as collected data, retrieves from the collected data, in accordance with a retrieval/distribution request sent from a data retrieval/distribution client, information designated in the retrieval/distribution request, and sends a retrieval result to the data retrieval/distribution client,
wherein the data retrieval/distribution server comprises:
a storage device which stores various programs and various types of information; and
a processing unit which executes the various types of processing based on the programs and the information stored in the storage device,
wherein the data retrieval/distribution method comprises:
a first step of the data retrieval/distribution client sending, to the data retrieval/distribution server, the retrieval/distribution request including a first retrieval condition using a virtual data conversion definition, the first retrieval condition indicating a virtual data conversion definition identifier pre-assigned to the virtual data conversion definition, which is a virtualization of a plurality of data conversion definitions as definitions for converting the collected data into a distribution format, the data conversion definitions respectively indicating a data conversion definition identifier, a conversion item name indicating an item name of a conversion item into which the collected data can be collected, and a conversion method indicating a method of converting the collected data into the corresponding conversion item;
a second step of the processing unit generating a second retrieval condition using each of the data conversion definitions from the first retrieval condition;
a third step of the processing unit executing retrieval processing according to the generated second retrieval condition; and
a fourth step of the processing unit sending a retrieval result of the retrieval processing to the data retrieval/distribution client as a retrieval result according to the first retrieval condition.

2. The data retrieval/distribution method according to claim 1,
wherein, in the fourth step, the processing unit:
aggregates processing results of the retrieval processing according to the second retrieval condition and sends an aggregation result to the data retrieval/distribution client.

3. The data retrieval/distribution method according to claim 1, wherein, in the virtual data conversion definition, items of different data formats in the collected data are associated as being a same item.

4. The data retrieval/distribution method according to claim 1,
wherein the virtual data conversion definition is configured from one or more virtual hierarchies,
wherein the virtual hierarchy is configured from one or more of the data conversion definitions or the virtual data conversion definitions, and
wherein the processing unit manages a configuration of the virtual hierarchy, refers to the configuration of the virtual hierarchy that the processing unit is managing, and generates the second retrieval condition from the first retrieval condition.

5. The data retrieval/distribution method according to claim 1,
wherein a timing for converting the collected data into the distribution format is designated for each of the data conversion definitions or each of the virtual data conversion definitions.

6. The data retrieval/distribution method according to claim 5,
wherein the timing is either a timing that the collected data was collected or a timing that the collected data is distributed.

7. A data retrieval/distribution system including a data retrieval/distribution server which collects data from a data source, accumulates the data that was collected as collected data, retrieves from the collected data, in accordance with a retrieval/distribution request sent from a data retrieval/distribution client, information designated in the retrieval/distribution request, and sends a retrieval result to the data retrieval/distribution client,
wherein the data retrieval/distribution client comprises:
a processor coupled to a memory storing instructions that when executed by the processor cause the processor to execute:
sending to the data retrieval/distribution server, the retrieval/distribution request including a first retrieval condition using a virtual data conversion definition, the first retrieval condition indicating a virtual data conversion definition identifier pre-assigned to the virtual data conversion definition, which is a virtualization of a plurality of data conversion definitions as definitions for converting the collected data into a distribution format, the data conversion definitions respectively indicating a data conversion definition identifier, a conversion item name indicating an item name of a conversion item into which the collected data can be collected, and a conversion method indicating a method of converting the collected data into the corresponding conversion item;

wherein the data retrieval/distribution server comprises:
a processor coupled to a memory storing instructions that when executed by the processor cause the processor to execute:
a retrieval condition generation unit which generates a second retrieval condition using each of the data conversion definitions from the first retrieval condition;
a retrieval execution unit which executes retrieval processing according to the generated second retrieval condition; and
a retrieval result sending unit which sends a retrieval result of the retrieval processing to the data retrieval/distribution client as a retrieval result according to the first retrieval condition.

8. The data retrieval/distribution system according to claim 7,
wherein the retrieval result sending unit comprises:
a retrieval result aggregation unit which aggregates processing results of the retrieval processing according to the second retrieval condition; and
an aggregation result sending unit which sends the processing results of the retrieval processing aggregated by the retrieval result aggregation unit to the data retrieval/distribution client.

9. The data retrieval/distribution system according to claim 7,
wherein, in the virtual data conversion definition, items of different data formats in the collected data are associated as being a same item.

10. The data retrieval/distribution system according to claim 7,
wherein the virtual data conversion definition is configured from one or more virtual hierarchies,
wherein the virtual hierarchy is configured from one or more of the data conversion definitions or the virtual data conversion definitions, and
wherein the retrieval condition generation unit manages a configuration of the virtual hierarchy, refers to the configuration of the virtual hierarchy that the processing unit is managing, and generates the second retrieval condition from the first retrieval condition.

11. The data retrieval/distribution system according to claim 7,
wherein a timing for converting the collected data into the distribution format is designated for each of the data conversion definitions or each of the virtual data conversion definitions.

12. The data retrieval/distribution system according to claim 11,
wherein the timing is either a timing that the collected data was collected or a timing that the collected data is distributed.

* * * * *